Nov. 10, 1953 — H. B. HEUER — 2,658,707
UTENSIL HOLDER
Filed June 20, 1951
Fig. 1.
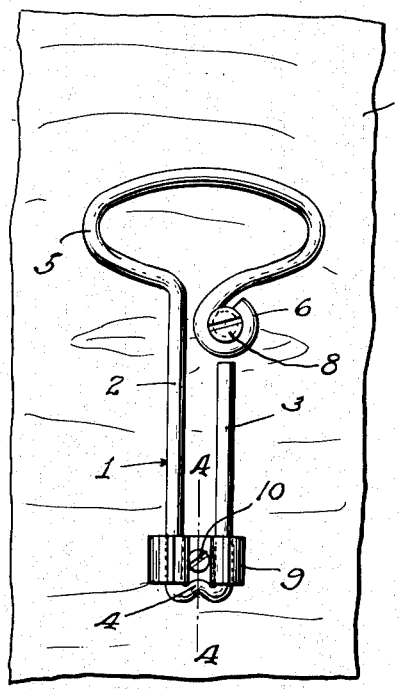
Fig. 2.
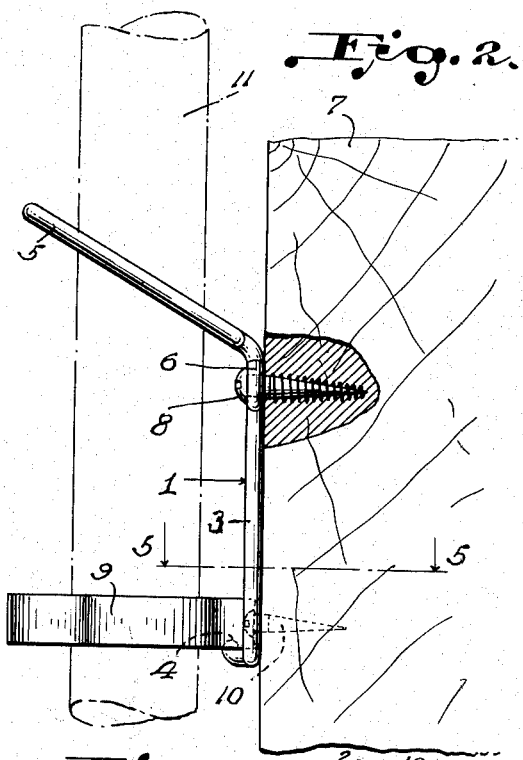
Fig. 3.
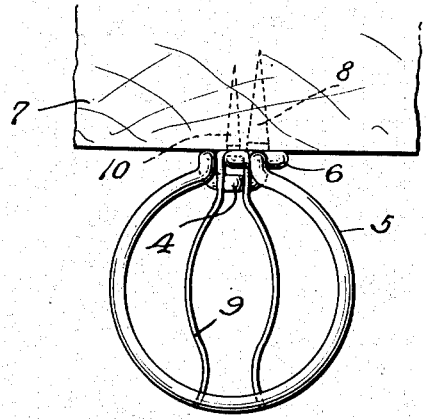
Fig. 4.
Fig. 5.
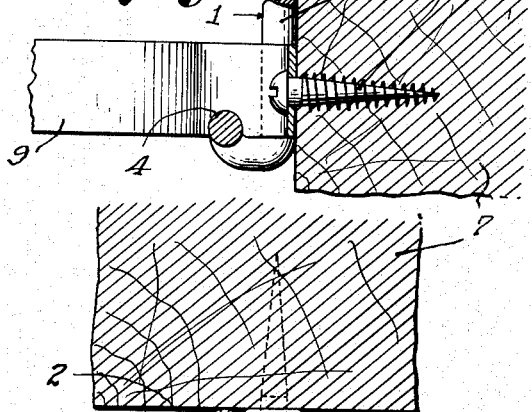
INVENTOR,
Henry B. Heuer
BY
E. E. Vrooman & Co.,
ATTORNEYS.

Patented Nov. 10, 1953

2,658,707

UNITED STATES PATENT OFFICE 2,658,707

UTENSIL HOLDER

Henry B. Heuer, Flint, Mich.

Application June 20, 1951, Serial No. 232,521

1 Claim. (Cl. 248—113)

This invention relates to a utensil holder.

An object of this invention is to provide an efficient device for hanging various utensils by their handles, such as brooms, mops, sticks, brushes, tools, golf clubs, etc., in conjunction with various spring clips known to the art today.

Another object of this invention is to provide a device which will facilitate the insertion of a handle in a spring clip without injuring the knuckles.

A still further object of this invention is to provide a holding device into which a handle can be first easily and quickly placed, and then said handle can be quickly placed in a standard spring clip, without undue effort or injury to the hand.

Another object of this invention is to provide a holder having a substantially U-shaped body and to form on its bottom an upwardly extending tit which will interlock with a standard spring clip, whereby the holding device will not turn out of its normal position, as well as being firm or rigid at all times.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a view in front elevation of the device constructed in accordance with this invention, while Figure 2 is a view in side elevation.

Figure 3 is a top plan view.

Figure 4 is an enlarged section, taken on line 4—4, Fig. 1.

Figure 5 is a horizontal, sectional view, taken on line 5—5, Fig. 2, and looking in the direction of the arrows.

Referring to the drawings in which the preferred embodiment of this invention is illustrated, I designates the body of the holder, which comprises a primary leg 2 and an auxiliary leg 3. These legs form a substantially U-shaped body that has at its bottom an upwardly bent or curved tip 4. At the upper end of the primary leg 2 is an integral loop 5. This loop extends upwardly from a horizontal plane, as is clearly seen in Figure 2. The outer end of the loop 5 is provided with a depending eye 6. When the device is attached to support 7, a suitable screw 8 is placed in eye 6, as shown.

The device is adapted to be assembled with a spring clip 9 of any ordinary structure. The spring clip 9 is positioned between the legs 2 and 3, with a screw 10 holding the clip 9 upon the support 7. The upwardly extending tip 10 is between the sides of the spring clip 9. By this construction, the holder is prevented from turning on the support 7, as well as preventing the spring clip turning on the screw 10. This structure produces a very durable device and one that gives a great deal of satisfaction.

In placing the handle 11, shown in dotted lines Fig. 2, the operator first places the handle in the loop 5, which acts something like a fulcrum, because when so placed, the outer portion of the handle will bear against the outer portion of the loop and then the operator can easily swing the handle inward, causing the handle to snap into place within the spring clip 9.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a holder for utensils having elongated handles, a body comprising a single length of wire having a portion adjacent one end of the wire bent to form an arcuate loop inclined upwardly and adapted to receive a utensil handle, said wire extending downward in a vertical plane for a short distance from one end of the looped portion and bent to form an eye for receiving a fastening screw, the other end of the looped portion having a vertical leg extending downwardly therefrom, said vertical leg having a vertically upstanding reversely bent portion at its lower end, the wire extending upwardly in a vertical direction from said vertically bent portion and in alinement with said eye to form a second leg, said legs being closely spaced, said holder also including a clip having a narrow portion between the sides of which is fitted an upturned portion of the wire, said leg portions engaging the narrow portion of the clip, said clip having a screw receiving opening in its narrow portion providing for a fastening screw extending between said leg portions.

HENRY B. HEUER.

References Cited in the file of this patent

UNITED STATES PATENTS

| Number | Name | Date |
|---|---|---|
| 664,217 | Jencke | Dec. 18, 1900 |
| 1,262,920 | Chovraldjy | Apr. 16, 1918 |
| 1,329,186 | Kindig | Jan. 27, 1920 |
| 1,435,842 | Hartman | Nov. 14, 1922 |